US011346456B2

(12) United States Patent
Kehl et al.

(10) Patent No.: US 11,346,456 B2
(45) Date of Patent: May 31, 2022

(54) VALVE ASSEMBLY AND ACTUATION ASSEMBLY INCLUDING THE SAME

(71) Applicant: KA Group AG, Zürich (CH)

(72) Inventors: Vincent Kehl, Shawinigan (CA); Bertrand Mallette, Shawinigan (CA); Simon Riverin-Gaudreau, Trois-Rivieres (CA); Rémi Tétreault, Shawinigan (CA); Bryan McKenzie, Saint-Maurice (CA)

(73) Assignee: KA Group AG, Zürich (CH)

( * ) Notice: Subject to any disclaimer, the term of this patent is extended or adjusted under 35 U.S.C. 154(b) by 22 days.

(21) Appl. No.: 16/961,126

(22) PCT Filed: Jan. 19, 2018

(86) PCT No.: PCT/IB2018/050363
§ 371 (c)(1),
(2) Date: Jul. 9, 2020

(87) PCT Pub. No.: WO2019/142021
PCT Pub. Date: Jul. 25, 2019

(65) Prior Publication Data
US 2020/0340594 A1 Oct. 29, 2020

(51) Int. Cl.
*A01G 25/16* (2006.01)
*F16K 27/02* (2006.01)

(52) U.S. Cl.
CPC ........ *F16K 27/029* (2013.01); *F16K 27/0263* (2013.01)

(58) Field of Classification Search
CPC .. F16K 27/0263; F16K 27/029; F16K 27/003; F16H 61/0003; F16H 61/0006; F16H 61/0009; Y10T 137/87885
See application file for complete search history.

(56) References Cited

U.S. PATENT DOCUMENTS 5,234,032 A * 8/1993 Kline ................. B60H 1/00642
137/884
5,887,624 A * 3/1999 Taniguchi ........... F16K 31/0665
137/884

(Continued)

OTHER PUBLICATIONS

International Search Report for Application No. PCT/IB2018/050363 dated Sep. 25, 2018, 3 pages.

*Primary Examiner* — Reinaldo Sanchez-Medina
(74) *Attorney, Agent, or Firm* — Howard & Howard Attorneys PLLC

(57) ABSTRACT

A valve assembly for use in an actuation assembly, with the actuation assembly including an actuation housing, includes a valve support adapted to be coupled to the actuation housing. The valve support has a body portion defining a plurality of solenoid bores. The valve assembly also includes a plurality of solenoids with each one of the plurality of solenoids disposed within a corresponding one of the plurality of solenoid bores and directly mounted to the valve support for controlling a flow of fluid. The valve assembly further includes an electrical power distribution device at least partially coupled to the valve support and connected to each of the plurality of solenoids. The valve assembly also includes a tray coupled to the body portion of the valve support to support a portion of the electrical power distribution device.

21 Claims, 8 Drawing Sheets

(56) References Cited

U.S. PATENT DOCUMENTS

| | | |
|---|---|---|
| 5,895,027 A | 4/1999 | Yagi |
| 7,707,872 B2 * | 5/2010 | Herbert ............... F15B 13/0835 73/49.7 |
| 8,780,564 B2 * | 7/2014 | Yanai .................... B60T 13/686 361/720 |
| 2004/0187942 A1 | 9/2004 | Ford et al. |

* cited by examiner

VALVE ASSEMBLY AND ACTUATION ASSEMBLY INCLUDING THE SAME

CROSS-REFERENCE TO RELATED APPLICATIONS

The present application claims priority to and is the National Stage of International Patent Application No. PCT/IB2018/050363 filed on Jan. 19, 2018, which is hereby expressly incorporated herein by reference in its entirety.

BACKGROUND OF THE INVENTION

1. Field of the Invention

The field of the invention generally relates to a valve assembly for use in an actuation assembly coupled to a transmission of a vehicle.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

In certain vehicles, such as trucks, commercial vehicles, dump trucks, line haul, and other construction vehicles, to control shifting in the automatic transmission, such vehicles often have a valve assembly for controlling fluid to control the transmission.

Typical actuation assemblies include a pump to provide pressurized fluid, and a plurality of valves for controlling the flow of fluid, which helps facilitate shifting and controlled engagement of the friction elements. In recent years, such automatic transmissions have used various electronic elements, such as solenoids, to control the plurality of valves for controlling the flow of fluid in the transmission.

SUMMARY OF THE INVENTION AND ADVANTAGES

A valve assembly for use in an actuation assembly, with the actuation assembly including an actuation housing coupled to a transmission to direct fluid, includes a valve support adapted to be coupled to the actuation housing. The valve support has a body portion defining a plurality of solenoid bores. The valve assembly also includes a plurality of solenoids with each one of the plurality of solenoids disposed within a corresponding one of the plurality of solenoid bores. The plurality of solenoids are directly mounted to the valve support for controlling a flow of fluid. The valve assembly further includes an electrical power distribution device at least partially coupled to the valve support. The electrical power distribution device is connected to each of the plurality of solenoids to provide electrical power to the plurality of solenoids to actuate the plurality of solenoids for controlling the fluid. The valve assembly also includes a tray coupled to the body portion of the valve support to support a portion of the electrical power distribution device.

Accordingly, the subject invention provides for an improved valve support for the valve assembly.

BRIEF DESCRIPTION OF THE DRAWINGS

Advantages of the present invention will be readily appreciated, as the same becomes better understood by reference to the following detailed description when considered in connection with the accompanying drawings.

DETAILED DESCRIPTION OF THE INVENTION

Figure 1:
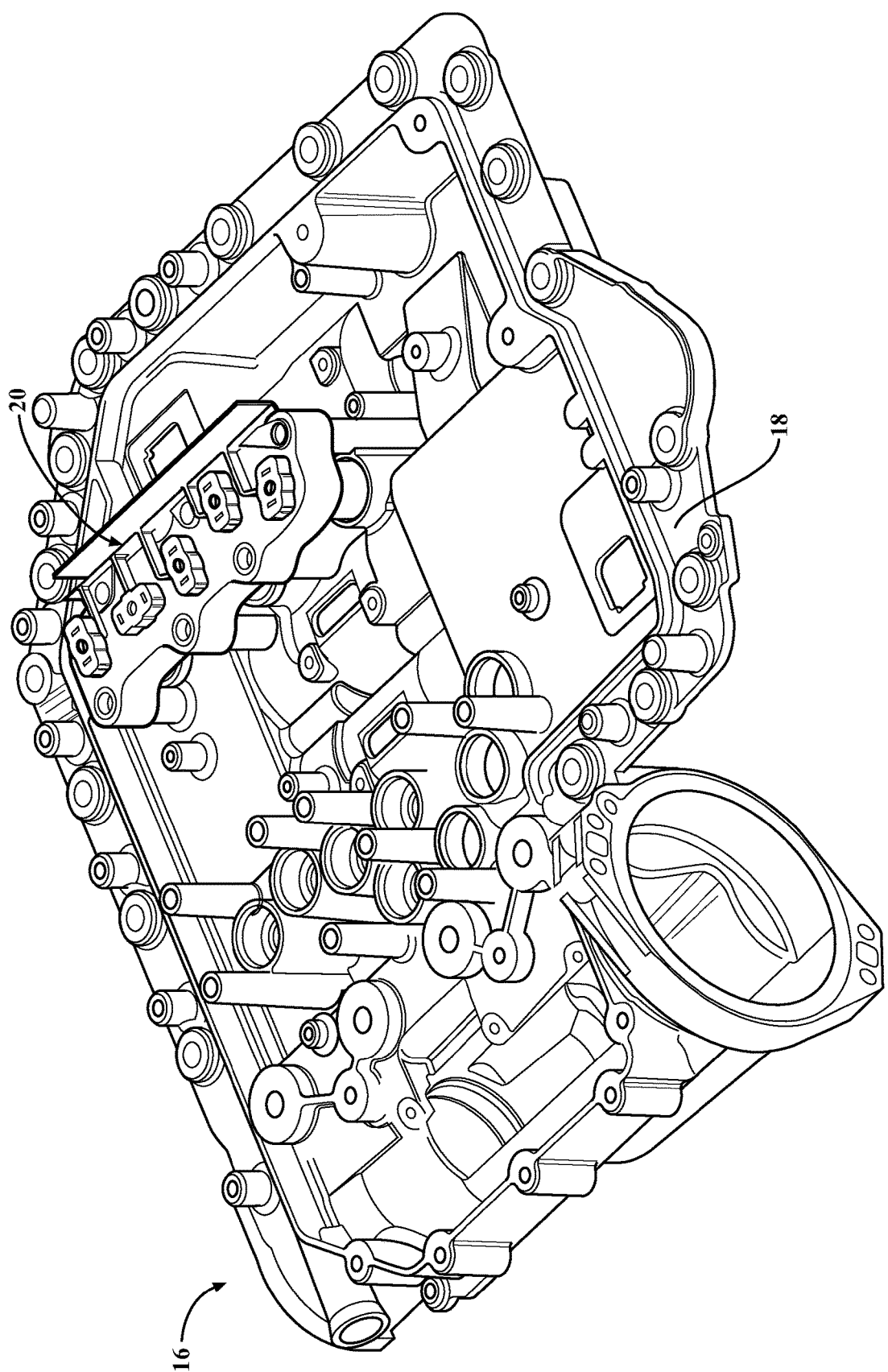
FIG. 1 is a perspective view of an actuation assembly including an actuation housing and a valve assembly.

With reference to the Figures, wherein like numerals indicate like parts throughout the several views, an actuation assembly 16 including an actuation housing 18 and a valve assembly 20 is shown in FIG. 1. The actuation housing 18 is adapted to be coupled to a transmission of a vehicle to direct fluid. The actuation housing 18 may be referred to as a lower cover. The valve assembly 20 is adapted to be coupled to the actuation housing 18, as best shown in FIG. 1. The actuation assembly and, in turn, the valve assembly 20 can be used in a transmission to direct fluid. The transmission can be used in trucks, commercial vehicles, dump trucks, line haul, and other construction vehicles.

Figure 2:
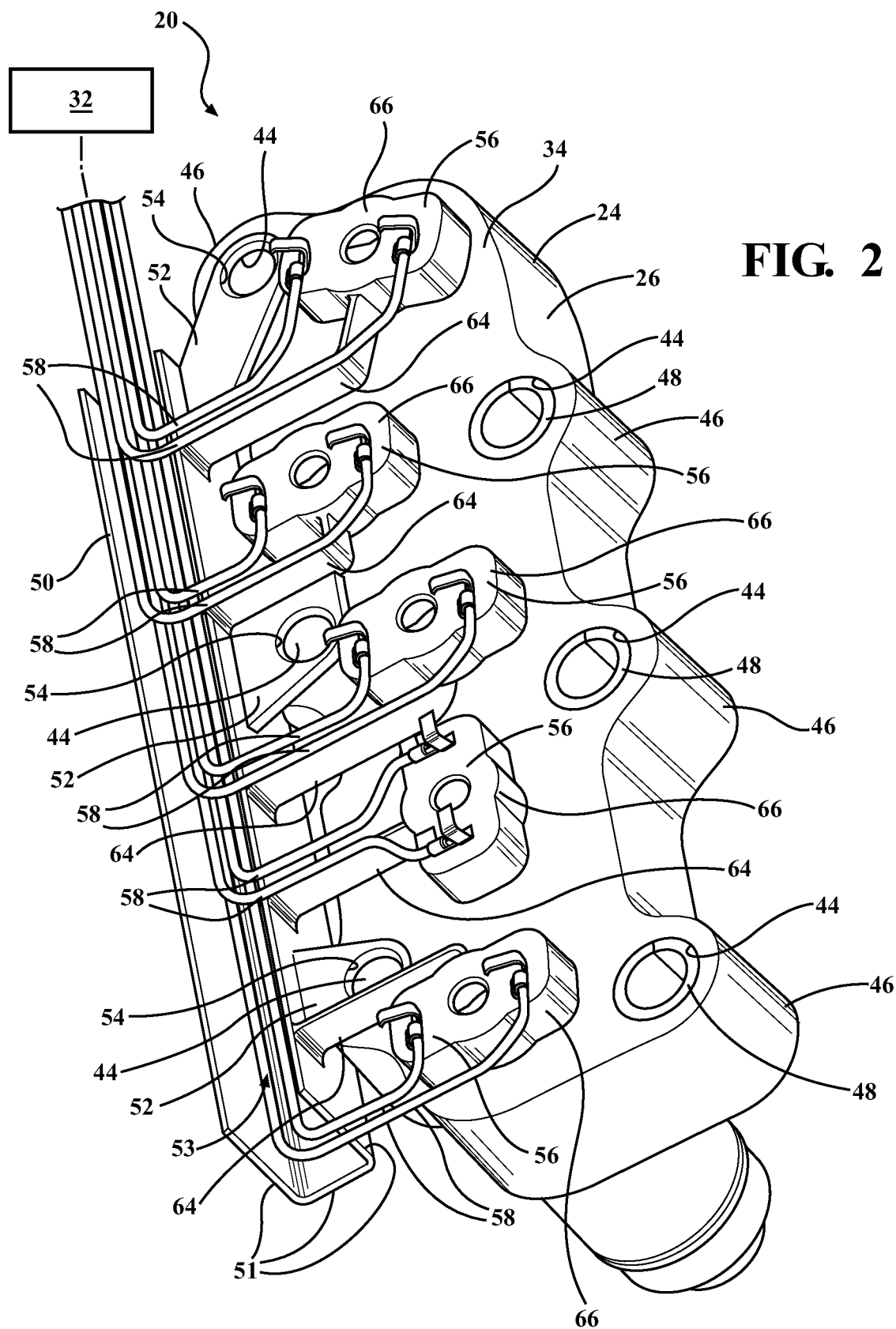
FIG. 2 is a perspective view of the valve assembly of FIG. 1, with the valve assembly including a valve support, a plurality of solenoids, and a tray.
Figure 3:
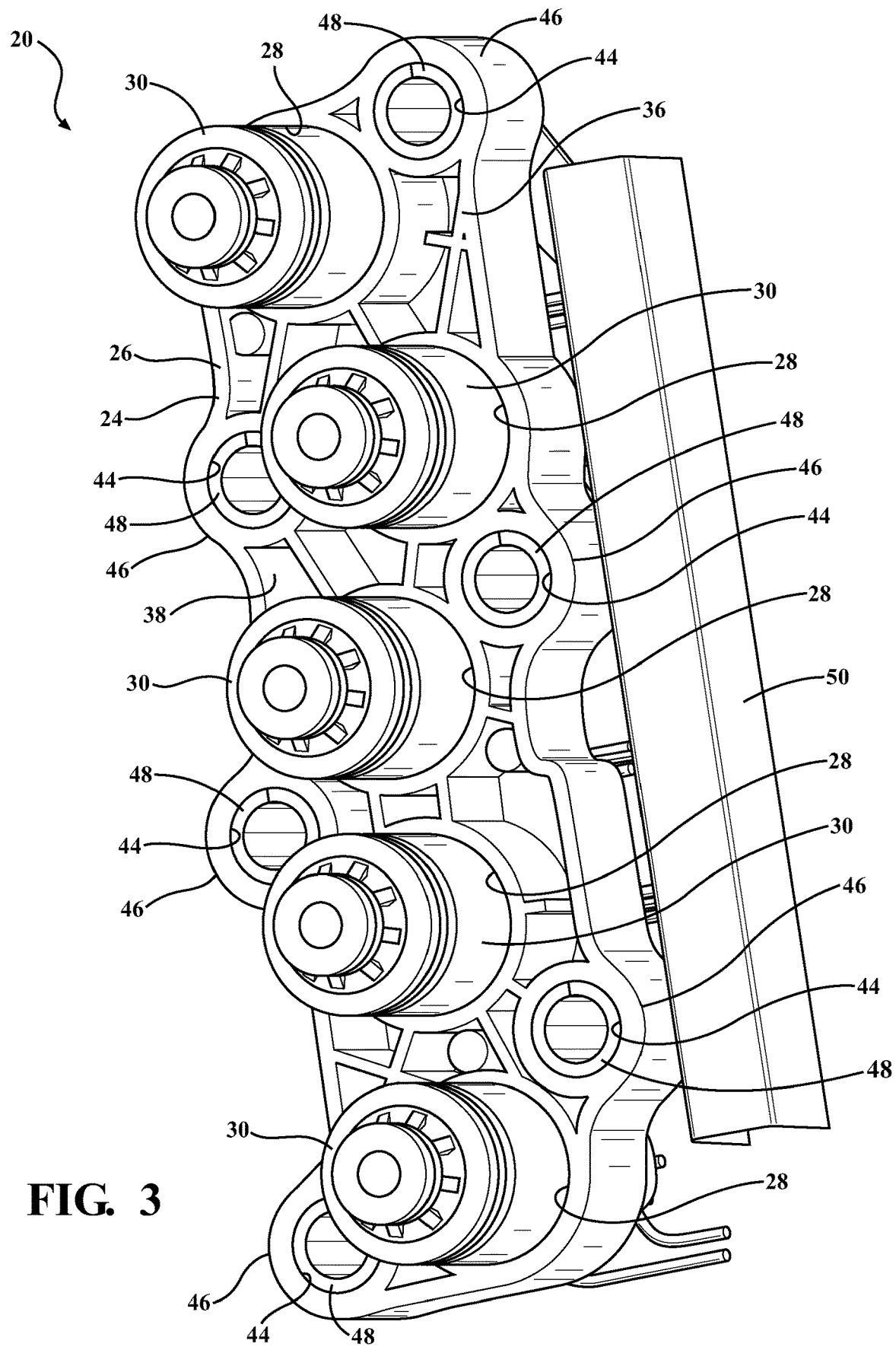
FIG. 3 is a perspective of the valve assembly of FIG. 1.
Figure 4:
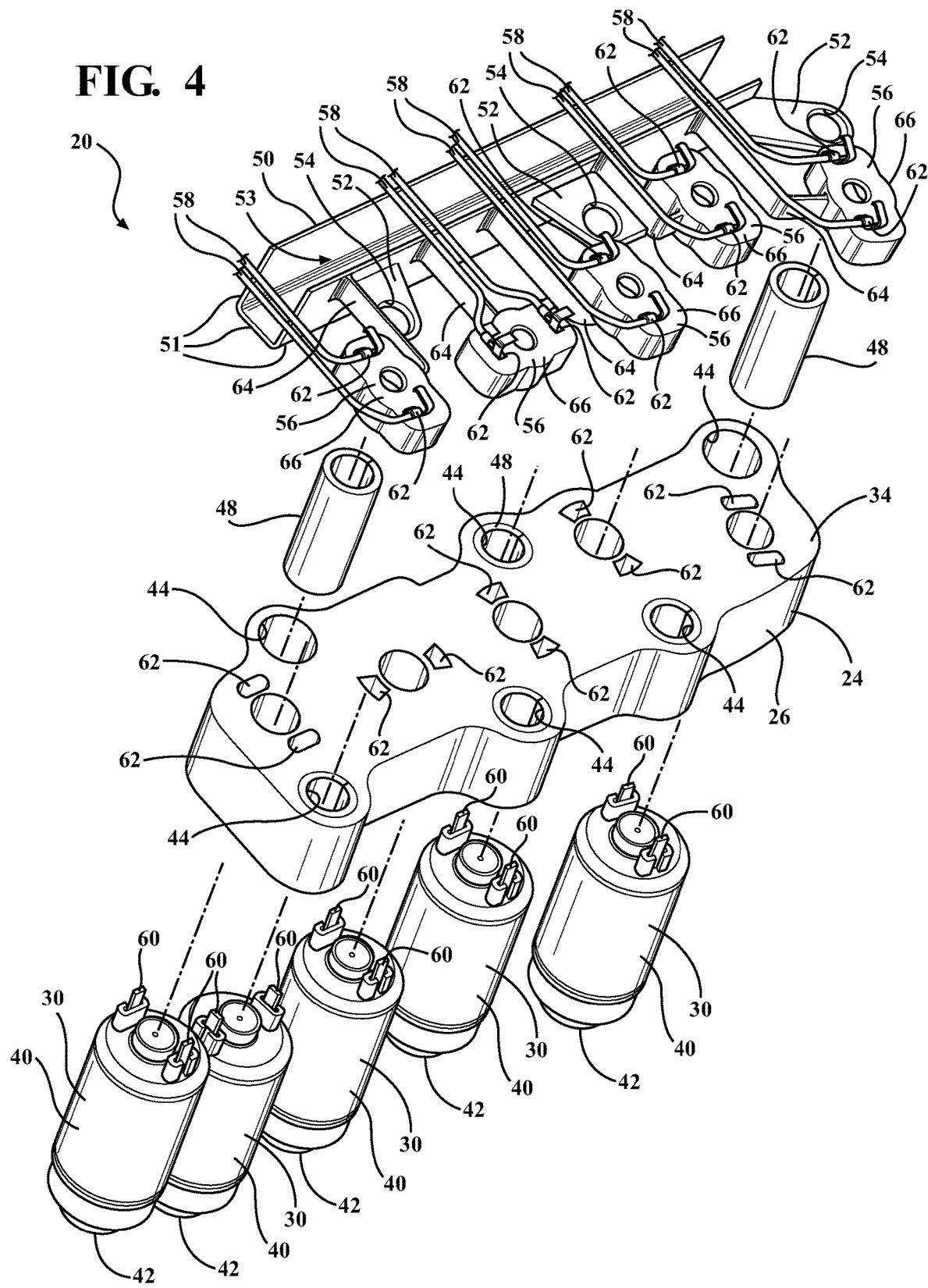
FIG. 4 is an exploded view of the valve assembly of FIG. 1.

With reference to FIGS. 2-4, the valve assembly 20 includes a valve support 24 adapted to be coupled to the actuation housing 18. The valve support 24 has a body portion 26 defining a plurality of solenoid bores 28.

The valve assembly 20 also includes a plurality of solenoids 30. Each one of the plurality of solenoids 30 is disposed within a corresponding one of the plurality of solenoid bores 28. The plurality of solenoids 30 are directly mounted to the valve support 24 for controlling a flow of fluid. The fluid may be compressed air or a hydraulic fluid. The fluid is typically used for controlling shifting in the transmission, such as opening and closing of a clutch and changing of gears of the transmission. Specifically, the plurality of solenoids 30 may control the flow of fluid, which, in turn, may control a pneumatic piston to cause controlled engagement of the clutch and/or changing of the gears of the transmission. The actuation assembly 16 and, in turn, the valve assembly 20 can be used in an automated manual transmission (AMT). The valve support 24 and the plurality of solenoids 30 can also be referred to as a valve bank.

The valve assembly 20 further includes an electrical power distribution device 32 at least partially coupled to the valve support 24. The electrical power distribution device 32 is connected to each of the plurality of solenoids 30 to provide electrical power to the plurality of solenoids 30 to actuate the plurality of solenoids 30 for controlling the fluid. The valve assembly 20 also includes a tray 50, as best shown in FIGS. 2-5, coupled to the body portion 26 of the valve support 24 to support a portion of the electrical power distribution device 32, as described in further detail below.

In one embodiment, the valve support 24 is be comprised entirely of a polymeric material. The valve support 24 of the valve assembly 20 being comprised entirely of the polymeric material is less expensive than traditional actuation assemblies due to a decrease in design and manufacturing costs. This reduction in design and manufacturing costs is due in part to the polymeric material being cheaper than metal. Further, this reduction in design in manufacturing costs is also due in part to the polymeric material being easier to design to conform to various electrical power distribution devices. Namely, for a different valve assembly 20, the valve support 24 comprised entirely of the polymeric material can be designed for each valve assembly 20 without the need to machine and design a metal plate for the valve support 24. In other words, the valve support 24 of the valve assembly 20 is free of a metal plate for providing a stiff valve support 24. Also, the valve support 24 of the valve assembly 20 comprised entirely of the polymeric material allows the valve support 24 to be designed for the electrical power distribution device 32 used in the valve assembly 20. Additionally, the valve support 24 of the valve assembly 20 comprised entirely of the polymeric material reduces the overall weight of the valve support 24 when compared to traditional valve supports, which helps with fuel economy.

Previous actuation assemblies require that the valve support also include the metal plate, which is required to have a stiff valve support when the electrical power distribution device is a printed circuit board (PCB). The stiff valve support is needed, otherwise compliant pins on the solenoids will break due to movement of the solenoids with respect to the valve support. Use of the PCB in actuation assemblies is undesirable, as using the PCB as the electronic power distribution device requires non-standard precision due to compliant pins of the solenoids, which increases design costs as tolerances are very small. However, the valve assembly 20 of the subject invention comprised entirely of the polymeric material is stiff enough to use with a wire harness, as described in further detail below. In some embodiments, the electrical power distribution device 32 may be a lead frame. When the electrical distribution device 32 is a lead frame, each one of the plurality of solenoids 30 may include weldable pins, rather than compliant pins, in which the lead frame can be welded to each weldable pin for connecting the lead frame to the plurality of solenoids 30.

The polymeric material of the valve support 24 may be an engineered plastic. Due to the extreme temperature conditions in the automotive environment and due to the need for the valve support 24 to support the plurality of solenoids 30, the polymeric material may have a broad temperature range and high tensile strength. The polymeric material of the valve support 24 may comprise about 30% glass fiber filling. In one embodiment, the polymeric material of the valve support 24 is further defined as polyphenylene sulfide (PPS).

The valve support 24 may have a first face 34 and a second face 36 opposite the first face 34, with the second face 36 defining a plurality of voids 38 disposed between the solenoid bores 28. The plurality of voids 38 help decrease the overall weight of the valve support 24, all while allowing the valve support 24 to be stiff enough for holding the plurality of solenoids 30.

In some embodiments, each of the plurality of solenoids 30 has a solenoid portion 40 and a valve portion 42, as best shown in FIG. 4. When present, the solenoid portion 40 of each of the plurality of solenoids 30 is disposed within one of the plurality of solenoid bores 28 such that the body portion 26 of the valve support 24 partially encapsulates the solenoid portion 40. The solenoid portion 40 each one of the plurality of solenoids 30 being disposed in a corresponding one of the plurality of solenoid bores 28 such that the valve support 24 partially encapsulates the solenoid portion 40 keeps the plurality of solenoids 30 from moving with respect to the valve support 24.

Figure 6:
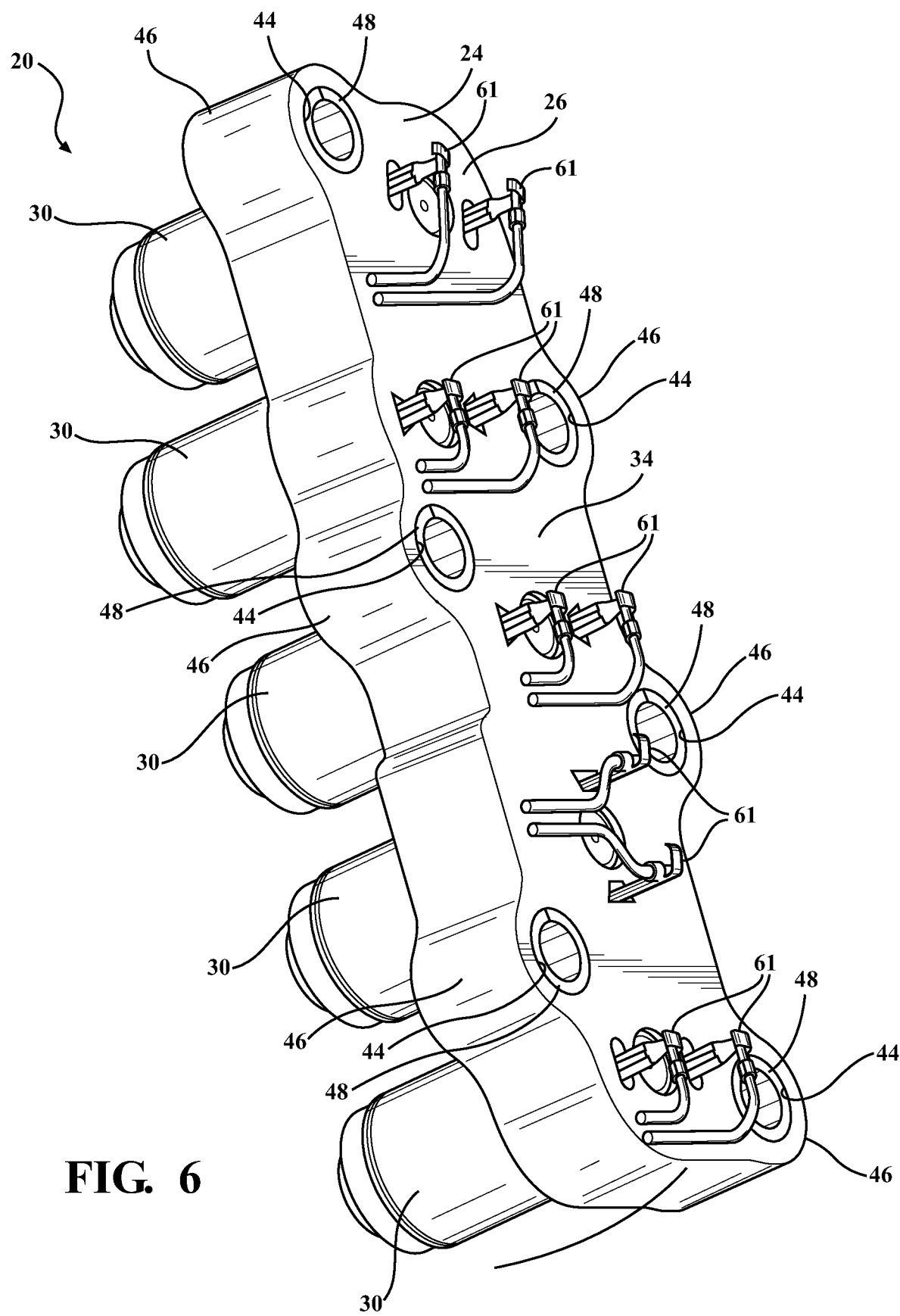
FIG. 6 is a perspective view of another embodiment of the valve assembly.

The body portion 26 of the valve support 24 may define a plurality of mounting bores 44 for receiving a fastener to couple the valve support 24 to the actuation housing 18. Each of the plurality of mounting bores 44 may be spaced from the plurality of solenoid bores 28. The plurality of mounting bores 44 allows the valve support 24 to be quickly coupled to the actuation housing 18. Specifically, the valve assembly 20 when being coupled to the actuation housing 18 may have each one of the plurality of solenoids 30 disposed within a corresponding one of the plurality of solenoid bores 28, which then allows the valve support 24 and, in turn, the plurality of solenoid 30 to be quickly coupled to the actuation housing 18. As best shown in FIG. 6, the plurality of mounting bores 44 may have a zig-zag configuration with respect to the valve support 24. In other words, the each one of the plurality of mounting bores 44 is offset from one another. Likewise, the plurality of solenoids 30 may also have a zig-zag configuration with respect to the valve support 24. In other words, each one of the plurality of solenoids 30 is offset from one another. In some embodiments, the zig-zag of the plurality of solenoids 30 corresponds with the zig-zag of the plurality of mounting bores 44, which helps with reducing a width W of the valve support 24.

The body portion 26 may have a plurality of outward projecting portions 46 spaced from the plurality of solenoid bores 28, with each of the plurality of outward projecting portions 46 defining one of the plurality of mounting bores 44. Although not required, to help reinforce the body portion 26, the valve assembly 20 may include a plurality of inserts 48 with each one of the plurality of inserts 48 being disposed within a corresponding one of the plurality of mounting bores 44 for receiving a fastener to couple the valve support 24 to the actuation housing 18.

The tray 50 helps the electrical power distribution device 32 to handle stress loads and vibrations during operation, and connecting the electrical power distribution device 32 to the plurality of solenoids 30. In this embodiment, the electrical power distribution 32 device may be a wire harness. When the electrical power distribution device 32 is a wire harness, the tray 50 supports a portion of the wire harness. The tray 50 may have a plurality of tray sides 51 defining a channel 53. The tray 50 supporting a portion of the wire harness allows the wire harness to be directly connected to the plurality of solenoids 30. Having the wire harness directly connected to the plurality of solenoids 30 due to the tray 50 supporting a portion of the wire harness reduces the number of electrical connections needed to control the plurality of solenoids 30. In other words, the wire harness may be directly connected to the plurality of solenoids 30, and additional connectors are not needed. Having the wire harness being directly connected to the plurality of solenoids 30 reduces assembly time and manufacturing costs, as the valve support 24, the tray 50, and the plurality of solenoids 30 may be coupled to the actuation housing 18 as a single unit, and then the wire harness is connected to the plurality of solenoids 30. In this embodiment, the valve support 24, the tray 50, and the plurality of solenoids 30 may be referred to as a valve bank. Although the valve assembly 20 shown throughout the FIGS. shows five solenoids 30, it is to be appreciated that any number of solenoids 30 may be used in the valve assembly 20. For example, the valve assembly 20 may have 13 to 15 solenoids 30.

Figure 5:
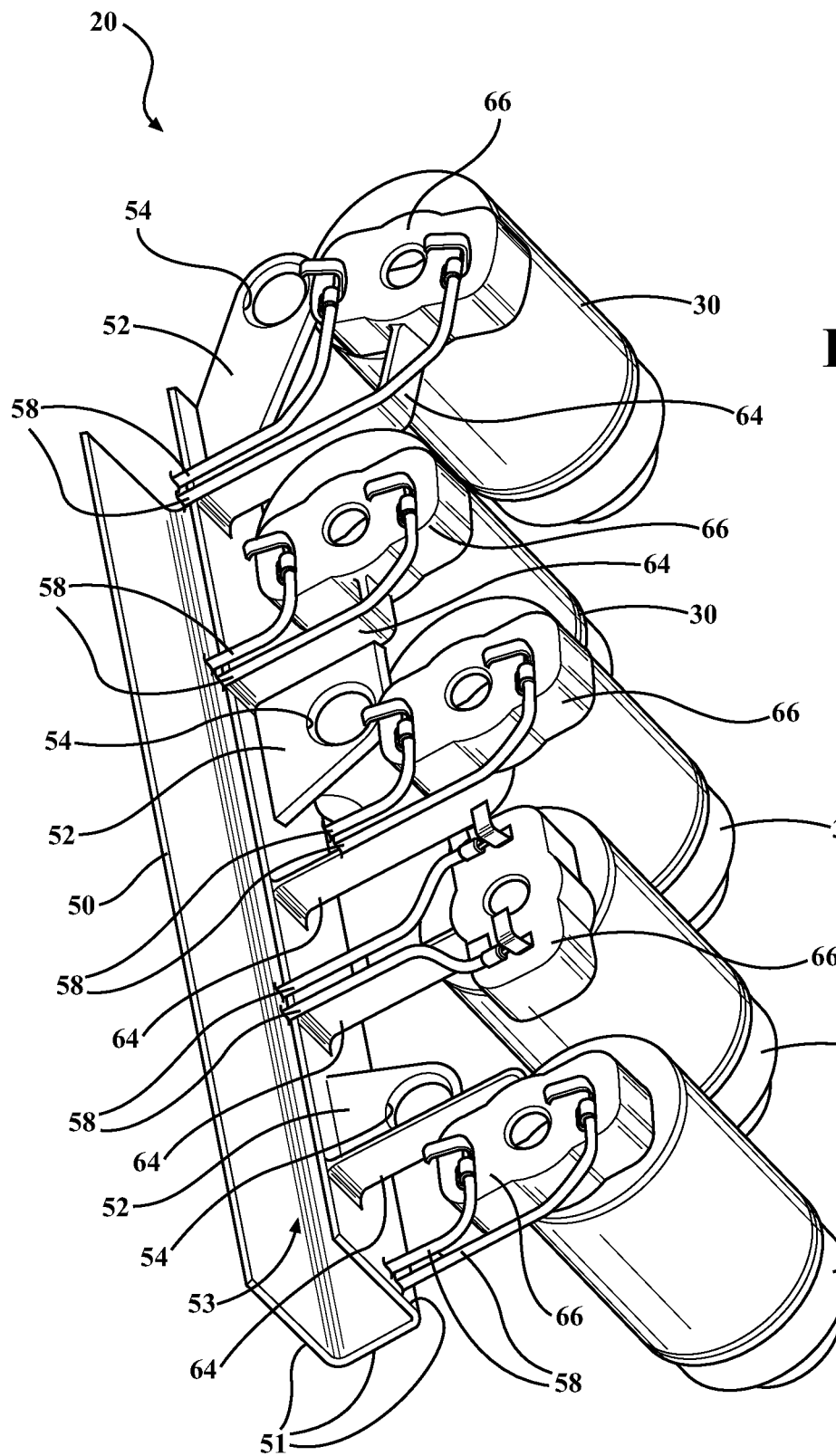
FIG. 5 is a perspective view of the valve assembly of FIG. 4 with the valve support hidden.
Figure 7:
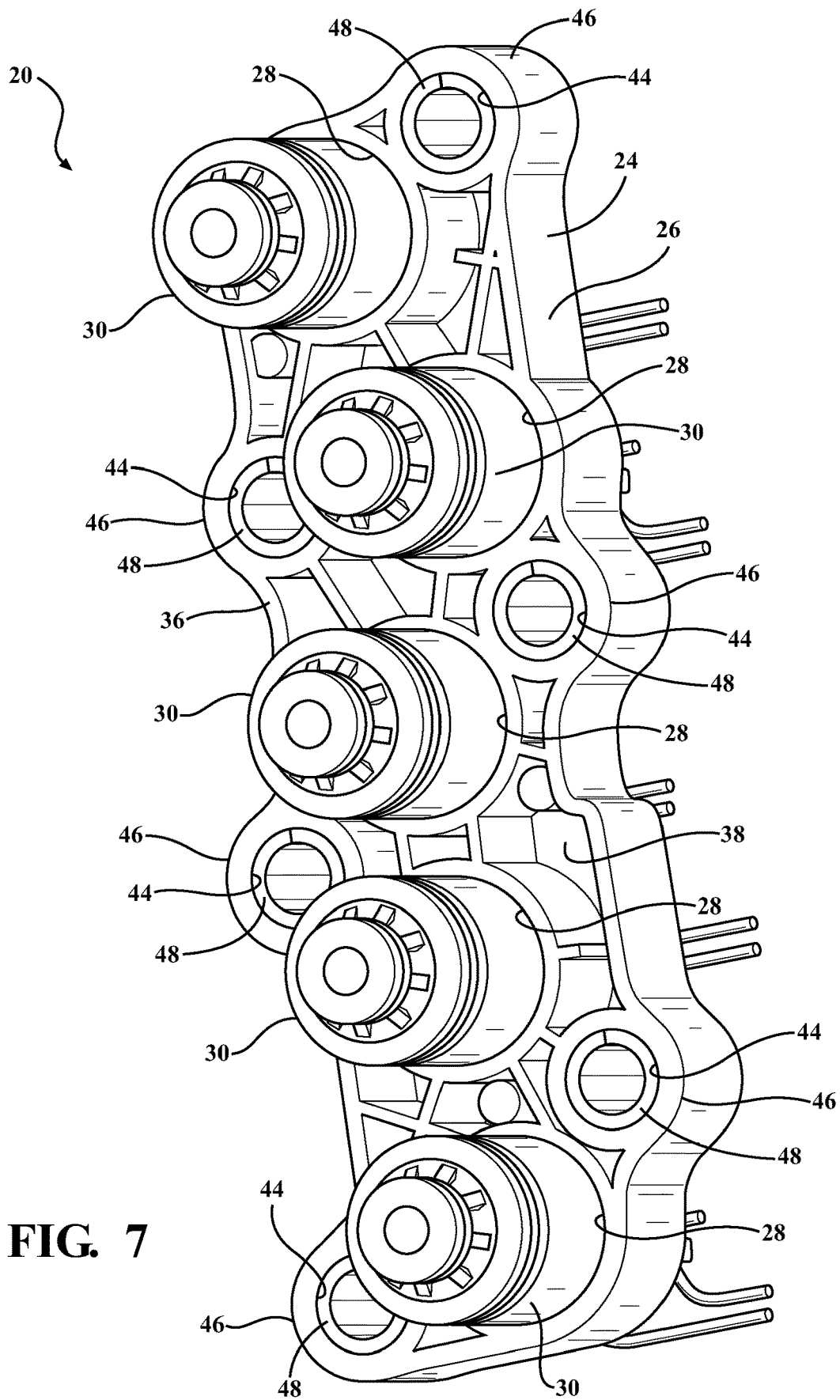
FIG. 7 is a perspective view of the valve assembly of FIG. 6.

The tray 50 may include a plurality of flanges 52 extending toward and directly mounted to the body portion 26 of the valve support 24 to couple the tray 50 to the body portion 26. In one embodiment, as best shown in FIGS. 5 and 7, the tray 50 includes three flanges 52. The plurality of flanges 52 may be integral, i.e., one piece, with the tray 50.

With reference to FIG. 2, when the valve assembly 20 includes the tray 50, the body portion 26 of the valve support 24 may define the plurality of mounting bores 44, and each of the plurality of flanges 52 may define a flange bore 54, with each of the plurality of mounting bores 44 aligned with one of the plurality of flange bores 54 for receiving a fastener to couple the valve support 24 to the actuation housing 18. It is to be appreciated that in some embodiments the tray 50 may be integral, i.e., one piece, with the body portion 26 of the valve support 24. When the tray 50 is integral with the body portion 26 of the valve support 24, the valve assembly 20 does not need fasteners to couple the tray 50 with the body portion 26. Additionally, when the tray 50 is integral with the body portion 26 of the valve support 24, the tray 50 and, in turn, the body portion 26 may be comprised entirely of a polymeric material. When the tray 50 and the body portion 26 are integral and comprised of a polymeric material, as described in detail above, decreases design and manufacturing costs, which is a result of the polymeric material being cheaper than metal and the polymeric material being easier to design to conform to various electrical power distribution devices.

Figure 8:
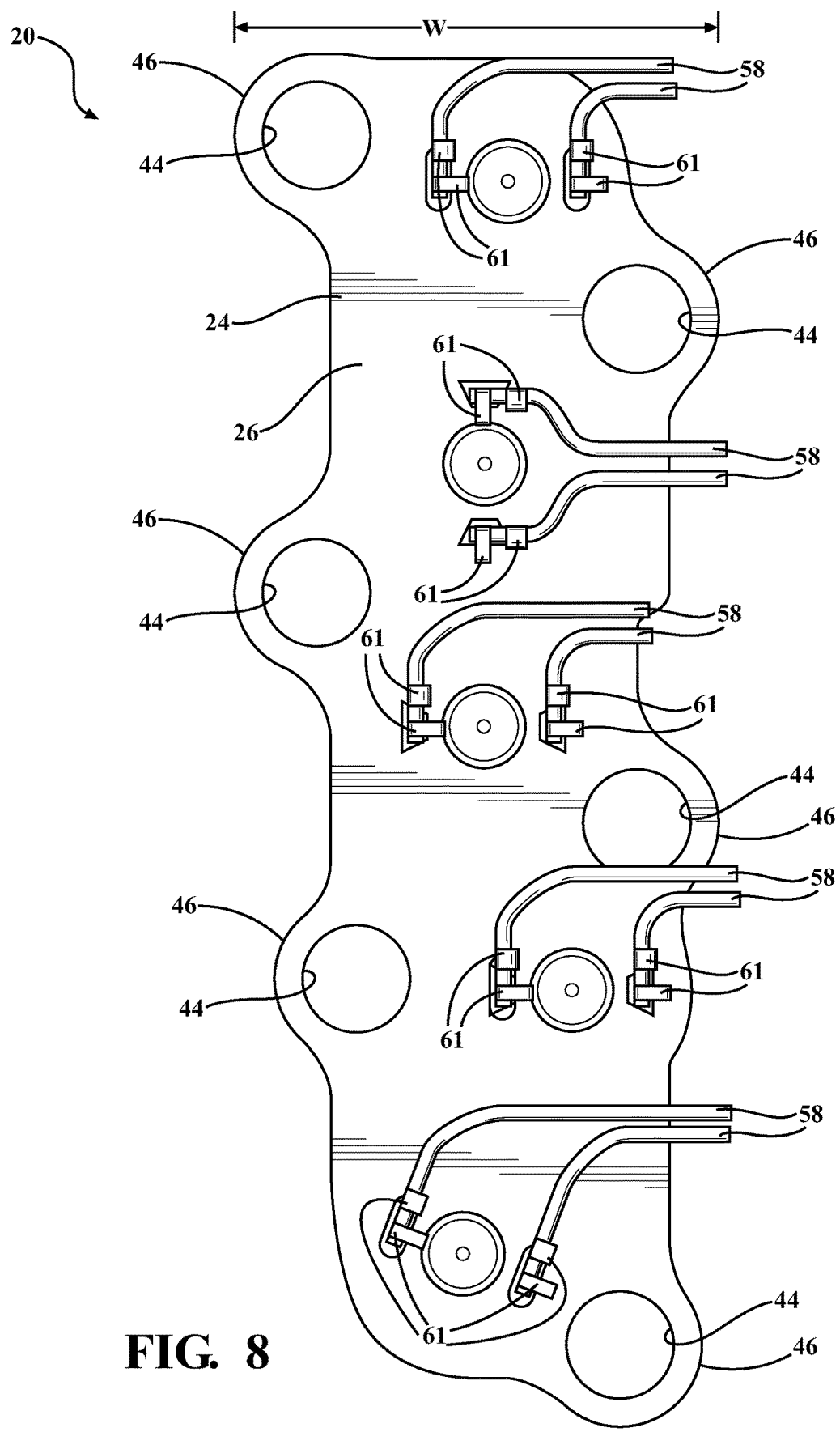
FIG. 8 is side view of the valve assembly of FIG. 6.

In one embodiment, as shown in FIGS. 2, 4, and 5, the tray 50 may include a plurality of connector portions 56 disposed about the body portion 26. In some embodiments, the electrical power distribution device 32 includes a plurality of electrical wires 58, with the plurality of connector portions 56 connecting the plurality of electrical wires 58 to the plurality of solenoids 30. As best shown in FIG. 8, the electrical power distribution device 32 may include a plurality of terminals 61 connected to each of the plurality of solenoids 30 and each of the plurality of electrical wires 58. The plurality of terminals 61 may be overmolded or press-fit on the plurality of solenoids 30. The body portion 26 may define a plurality of terminal holes 62, with each of the terminals 61 extending from the plurality of solenoids 30 to the plurality of electrical wires 58 through the plurality of terminal holes 62. The plurality of terminal holes 62 may also be defined through the plurality of connector portions 56. The plurality of solenoids 30 may each have a plurality of solenoid terminals 60 for connecting with the plurality of terminals 61. Specifically, the plurality of solenoid terminals 60 may be coupled to the plurality of electrical wires 58 by the plurality of terminals 61 through a male-female connection, with the plurality of terminals 61 being crimped to the plurality of electrical wires 58, as best shown in FIG. 6.

The tray 50 makes connecting the electrical power distribution device 32 to the plurality of solenoids 30 easier. Specifically, once the electrical power distribution device 32 is coupled to the tray 50, the connection between the plurality of electrical wires 58 of the electrical power distribution device 32 allows for easy connection to the plurality of solenoids 30. Additionally, once the plurality of electrical wires 58 are coupled to the tray 50, the connection of the plurality of electrical wires 58 to the plurality of solenoids 30 cannot be incorrectly connected, as the tray 50 directs the plurality of electrical wires 58.

Each of connector portions 56 may be further defined as a connector arm 64 and a connector body 66. When present, the connector arm 64 extends from the tray 50 toward the body portion 26 of the valve support 24, with the connector body 66 disposed adjacent one of the plurality of solenoids 30. The connector arm 64, the connector body 66, and the tray 50 may be integral with one another.

The plurality of connector portions 56 provide support for the electrical power distribution device 32 to connect with the plurality of solenoids 30. As described above, when the electrical power distribution device 32 is a wire harness, the tray 50 supports a portion of the wire harness. When the plurality of connector portions 56 of the tray are present, the plurality of connector portions 56 allow for a direct connection of the plurality of electrical wires 58 with the plurality of solenoids 30.

The valve support 24 can be manufactured first, and then the plurality of solenoids 30 may be disposed within the plurality of solenoid bores 28 defined by the valve support 24. The plurality of solenoids 30 may be press fit within the plurality of solenoid bores 28. After the plurality of solenoids 30 are disposed within the plurality of solenoid bores 28, the valve support 24 and, in turn, the plurality of solenoids 30 are coupled to the actuation housing 18. Once the valve support 24 and, in turn, the plurality of solenoids 30 are coupled to the actuation housing 18, the electrical power distribution device 32 may be connected to each of the plurality of solenoids 30. When the valve support 24 is coupled to the actuation housing 18 and the electrical power distribution device 32 is connected to the plurality of solenoids 30, the actuation housing 18 may then be mounted to the transmission. When the electrical power distribution device 32 is the wire harness, the wire harness is then connected to the plurality of solenoids 30.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A valve assembly for use in an actuation assembly, with the actuation assembly including an actuation housing coupled to a transmission of a vehicle to direct fluid, said valve assembly comprising: a valve support adapted to be coupled to the actuation housing, with said valve support having a body portion defining a plurality of solenoid bores; a plurality of solenoids with each one of said plurality of solenoids disposed within a corresponding one of said plurality of solenoid bores, and with said plurality of solenoids being directly mounted to said valve support for controlling a flow of fluid; an electrical power distribution device at least partially coupled to said valve support with said electrical power distribution device connected to each of said plurality of solenoids to provide electrical power to said plurality of solenoids to actuate said plurality of solenoids for controlling the flow of fluid; a tray coupled to said body portion of said valve support; wherein said tray has a support portion configured to support a portion of said electrical power distribution device; wherein said support portion of said tray is disposed adjacent a side portion of said valve support; and wherein said valve support has a first face and a second face opposite said first face, wherein said plurality of solenoid bores extend at least partially between said first face and said second face, and wherein said side portion extends between said first face and said second face.

2. The valve assembly as set forth in claim 1, wherein said tray has a plurality of flanges extending toward and directly mounted to said body portion of said valve support to couple said tray to said body portion.

3. The valve assembly as set forth in claim 2, wherein each of said plurality of flanges defines a flange bore, and wherein said body portion of said valve support defines a plurality of mounting bores for receiving a fastener to couple said valve support to the actuation housing, with each of said plurality of mounting bores aligned with one of said plurality of flange bores for receiving a fastener to couple said valve support to the actuation housing.

4. The valve assembly as set forth in claim 1, wherein said body portion of said valve support defines a plurality of mounting bores for receiving a fastener to couple said valve support to the actuation housing.

5. The valve assembly as set forth in claim 4, wherein said body portion has a plurality of outward projecting portions spaced from said plurality of solenoid bores with each of said plurality of outward projection portions defining one of said plurality of mounting bores.

6. The valve assembly as set forth in claim 1, wherein said tray comprises a plurality of connector portions disposed about said body portion.

7. The valve assembly as set forth in claim 6, wherein said electrical power distribution device includes a plurality of electrical wires, with said plurality of connector portions connecting said plurality of electrical wires to said plurality of solenoids.

8. The valve assembly as set forth in claim 7, wherein said electrical power distribution device comprises a plurality of terminals connected to each of said plurality of solenoids and each of said plurality of electrical wires.

9. The valve assembly as set forth in claim 8, wherein said body portion defines a plurality of terminal holes, with each of said terminals extending from said plurality of solenoids to said plurality of electrical wires through said plurality of terminal holes.

10. The valve assembly as set forth in claim 6, wherein each of said connector portions of said plurality of connector portions are further defined as a connector arm and a connector body, with said connector arm extending from said tray toward said body portion of said valve support, and with said connector body disposed adjacent one of said plurality of solenoids.

11. The valve assembly as set forth in claim 1, wherein said valve support is comprised entirely of a polymeric material.

12. The valve assembly as set forth in claim 1, wherein each of said plurality of solenoids has a solenoid portion and a valve portion with said solenoid portion of each of said plurality of solenoids being disposed within one of said plurality of solenoid bores such that said body portion of said valve support partially encapsulates said solenoid portion.

13. The valve assembly as set forth in claim 1, wherein said valve support has a first face and a second face opposite said first face, with said second face defining a plurality of voids disposed between said solenoid bores.

14. The valve assembly as set forth in claim 1, wherein said plurality of solenoids have a zig-zag configuration with respect to said valve support.

15. The valve assembly as set forth in claim 1, wherein said tray has a plurality of tray sides defining a channel.

16. An actuation assembly coupled to a transmission of a vehicle to direct fluid, said actuation assembly comprising:
    said valve assembly as set forth in claim 1; and
    said actuation housing, with said actuation housing being adapted to be coupled to the transmission.

17. The actuation assembly as set forth in claim 16, wherein said valve support is comprised entirely of a polymeric material.

18. The actuation assembly as set forth in claim 16, wherein said tray has a plurality of flanges extending toward and directly mounted to said body portion of said valve support to couple said tray to said body portion.

19. The actuation assembly as set forth in claim 16, wherein said tray comprises a plurality of connector portions disposed about said body portion, and wherein each of said connector portions of said plurality of connector portions are further defined as a connector arm and a connector body, with said connector arm extending from said tray toward said body portion of said valve support, and with said connector body disposed adjacent one of said plurality of solenoids.

20. A valve assembly for use in an actuation assembly, with the actuation assembly including an actuation housing coupled to a transmission of a vehicle to direct fluid, said valve assembly comprising:
    a valve support adapted to be coupled to the actuation housing, with said valve support having a body portion defining a plurality of solenoid bores;
    a plurality of solenoids with each one of said plurality of solenoids disposed within a corresponding one of said plurality of solenoid bores, and with said plurality of solenoids being directly mounted to said valve support for controlling a flow of fluid;
    an electrical power distribution device at least partially coupled to said valve support with said electrical power distribution device connected to each of said plurality of solenoids to provide electrical power to said plurality of solenoids to actuate said plurality of solenoids for controlling the flow of fluid; and
    a tray coupled to said body portion of said valve support to support a portion of said electrical power distribution device;
    wherein said tray comprises a plurality of connector portions disposed about said body portion; and
    wherein each of said connector portions of said plurality of connector portions are further defined as a connector arm and a connector body, with said connector arm extending from said tray toward said body portion of said valve support, and with said connector body disposed adjacent one of said plurality of solenoids.

21. An actuation assembly coupled to a transmission of a vehicle to direct fluid, said actuation assembly comprising:
    said valve assembly as set forth in claim 20; and
    said actuation housing, with said actuation housing being adapted to be coupled to the transmission.

* * * * *